March 5, 1963 R. C. HANSEN ET AL 3,079,874
EQUIPMENT FOR TRANSPORTING SHEET MATERIALS
Filed March 23, 1959 8 Sheets-Sheet 1
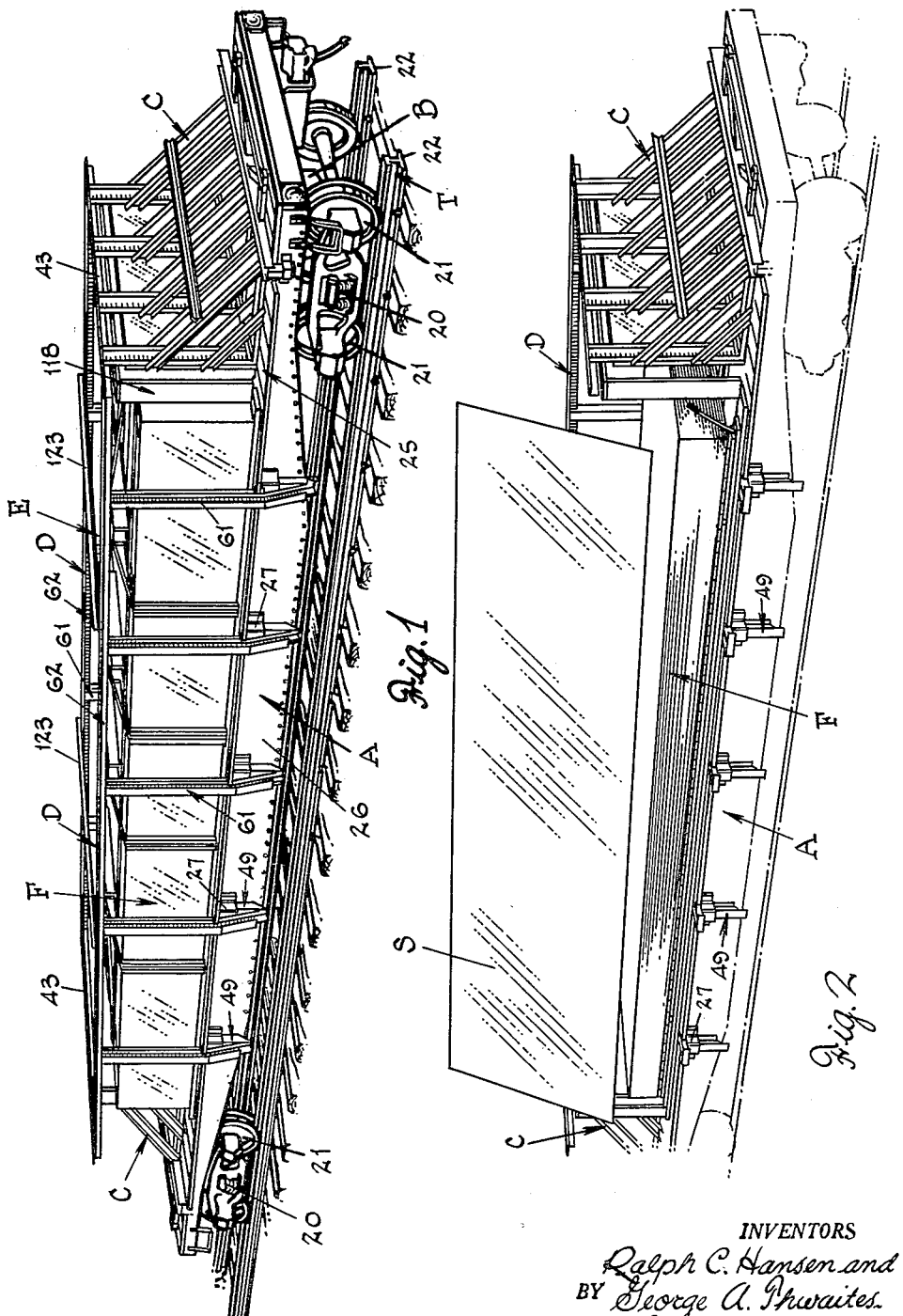
INVENTORS
Ralph C. Hansen and
BY George A. Thwaites
Nobbe & Swope
ATTORNEYS

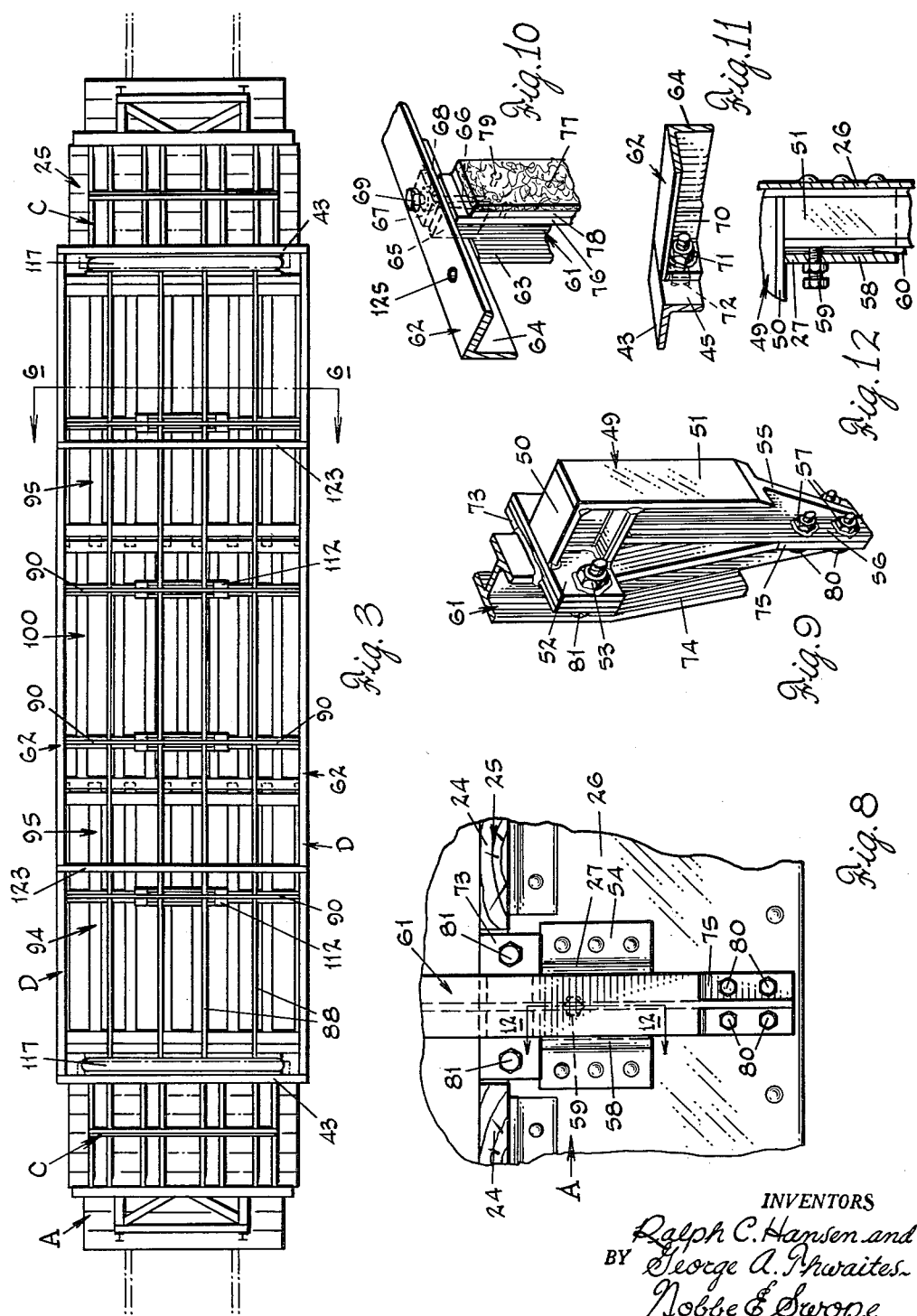

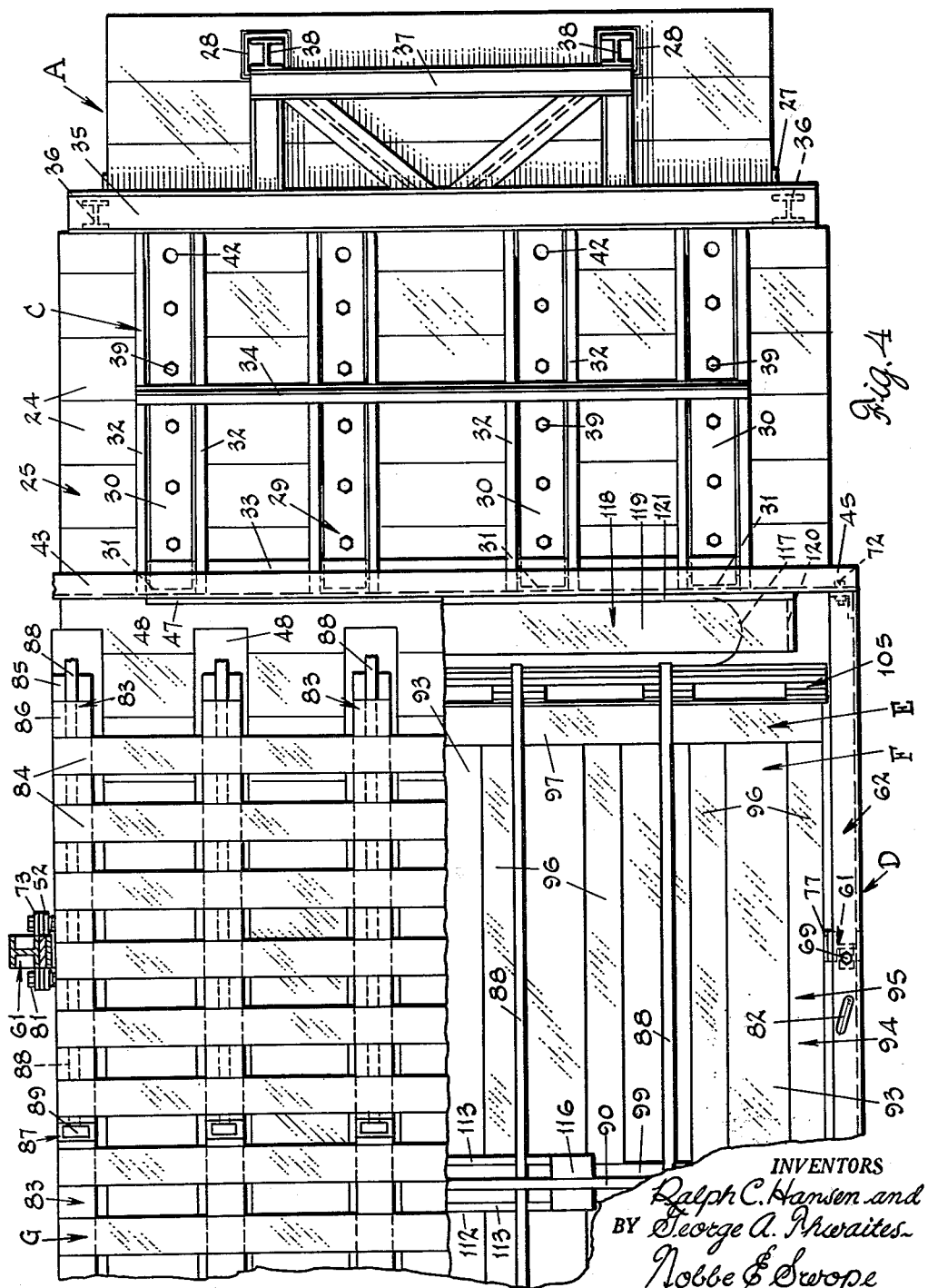

INVENTORS
Ralph C. Hansen and
BY George A. Thwaites
Nobbe & Swope
ATTORNEYS

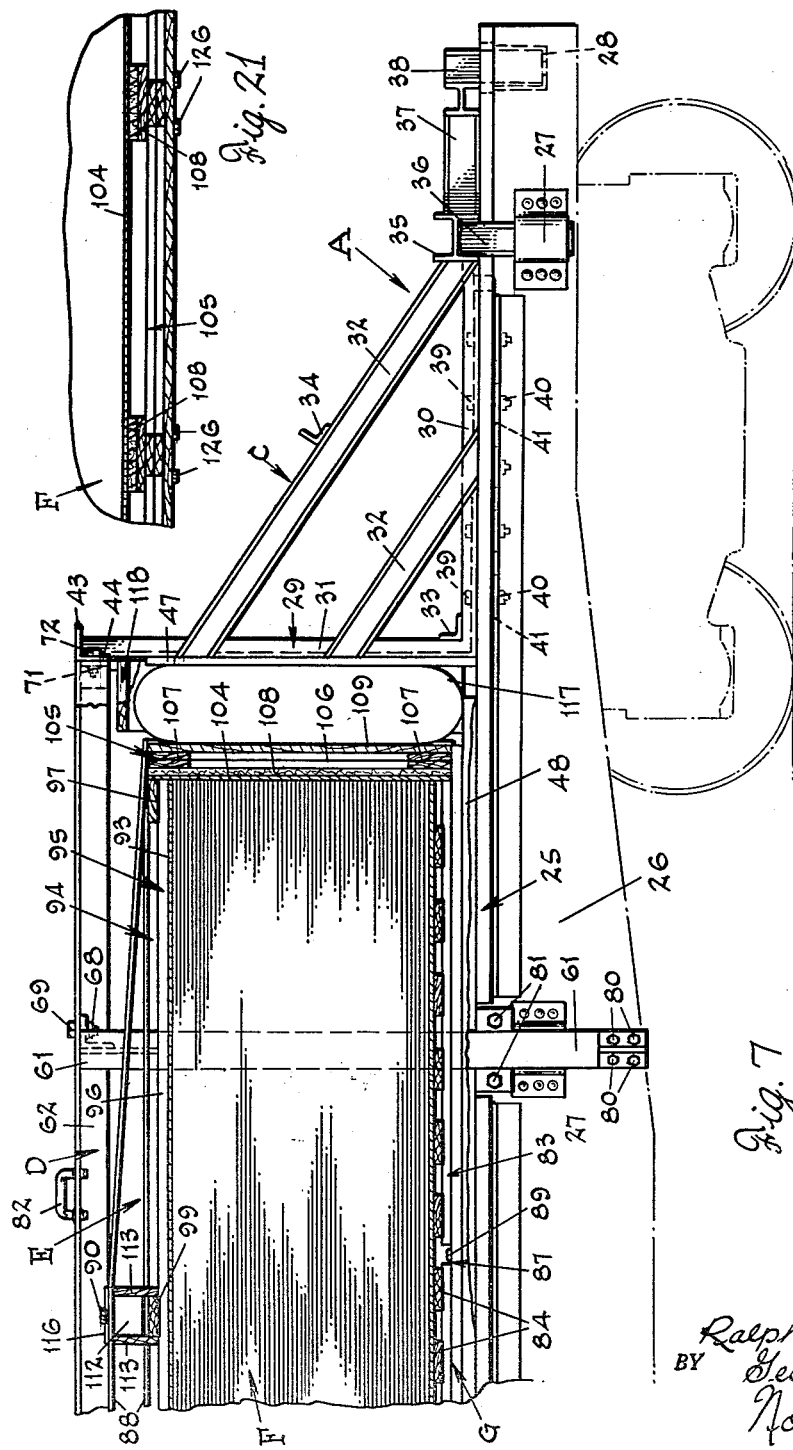

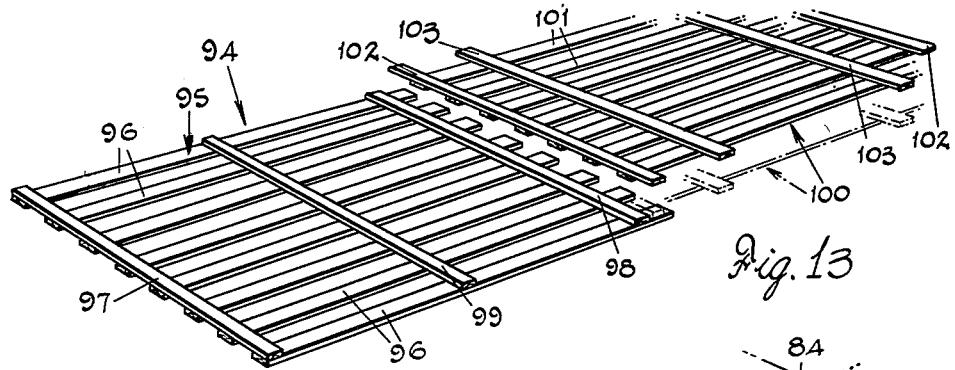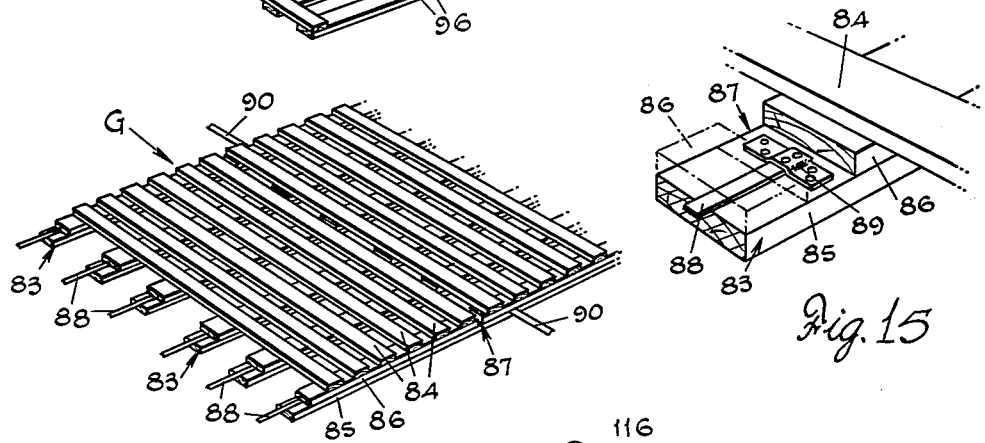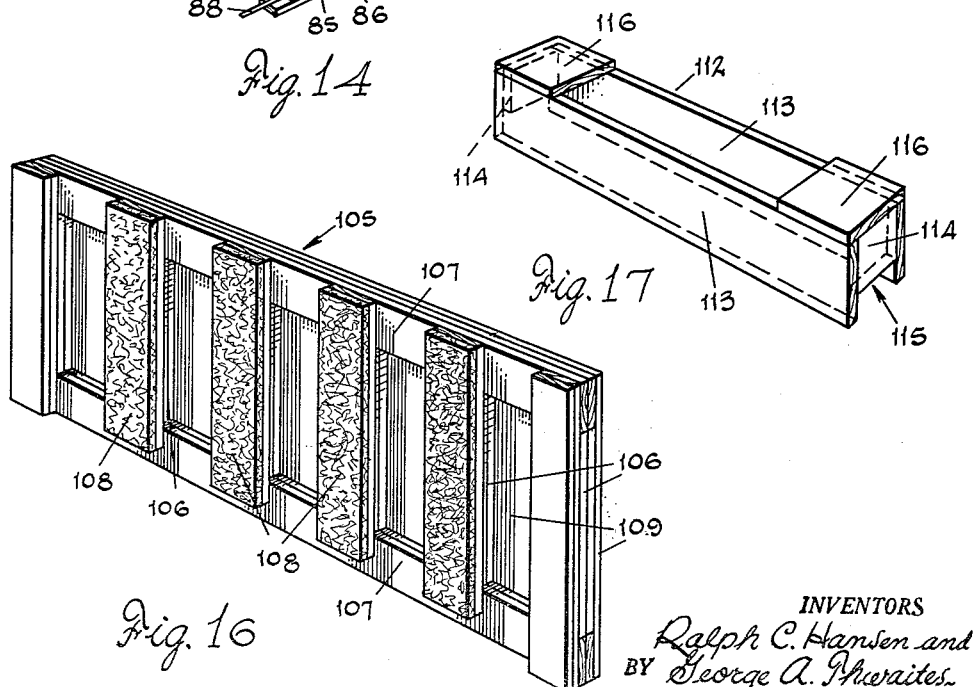

March 5, 1963 R. C. HANSEN ET AL 3,079,874
EQUIPMENT FOR TRANSPORTING SHEET MATERIALS
Filed March 23, 1959 8 Sheets-Sheet 7

INVENTORS
Ralph C. Hansen and
BY George A. Thwaites
Nobbe & Swope
ATTORNEYS

March 5, 1963 R. C. HANSEN ET AL 3,079,874
EQUIPMENT FOR TRANSPORTING SHEET MATERIALS
Filed March 23, 1959 8 Sheets-Sheet 8
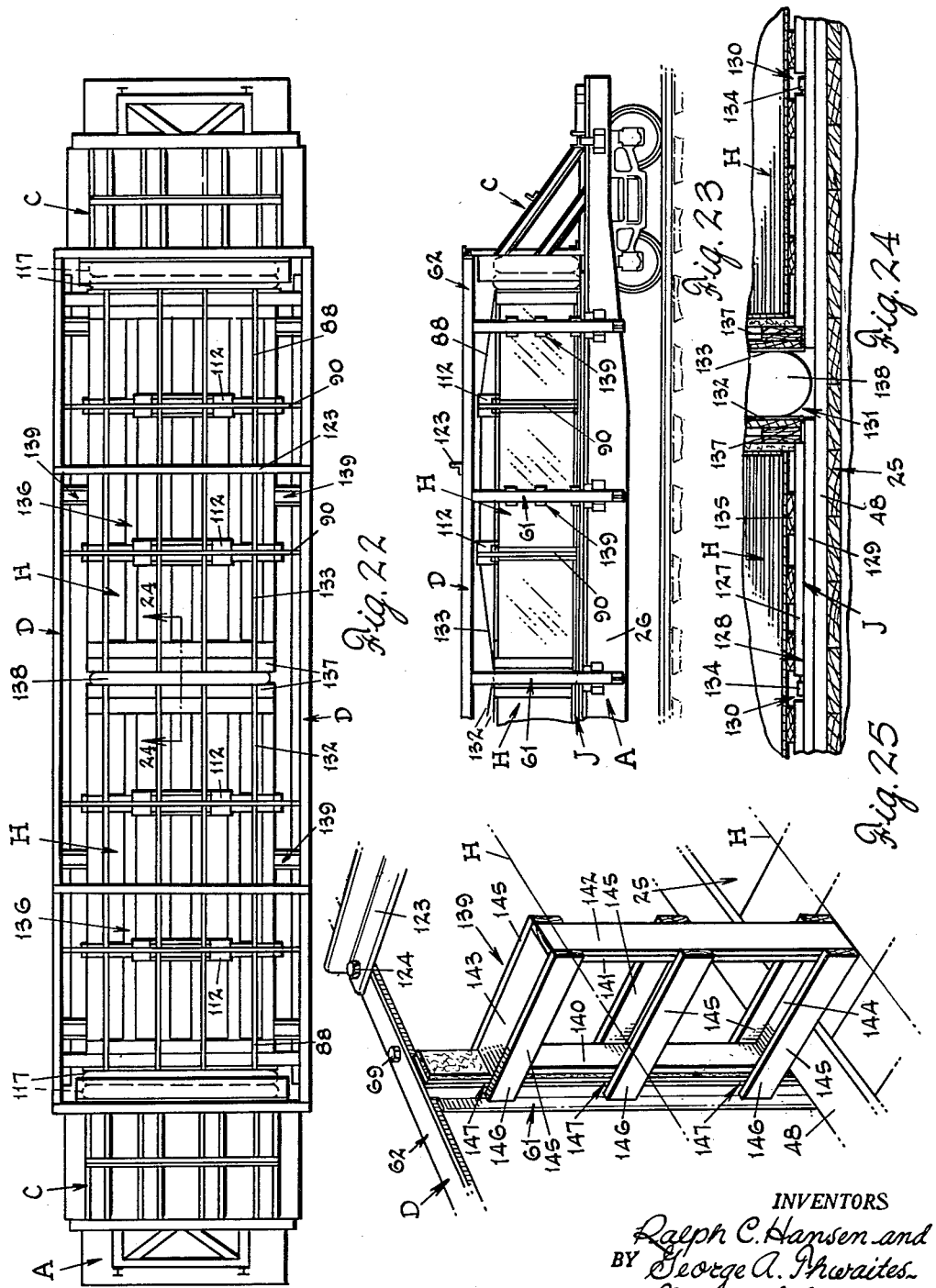
INVENTORS
Ralph C. Hansen and
BY George A. Thwaites
Nobbe & Swope
ATTORNEYS United States Patent Office 3,079,874
Patented Mar. 5, 1963

3,079,874
EQUIPMENT FOR TRANSPORTING SHEET
MATERIALS
Ralph C. Hansen, Toledo, Ohio, and George A. Thwaites, Charleston, W. Va., assignors to Libbey-Owens-Ford Glass Company, Toledo, Ohio, a corporation of Ohio
Filed Mar. 23, 1959, Ser. No. 801,283
2 Claims. (Cl. 105—367)

This invention relates broadly to the transportation of sheet materials and, more particularly, has to do with improved equipment whereby a maximum load of glass sheets can be transported with a minimum amount of breakage.

Heretofore, when shipping glass sheets for long distances, it has been conventional practice to transport them in unitized packages and in the well-known box car. Briefly stated, the present invention contemplates the carrying of blanks or sheets of glass having dimensional sizes that far exceed any size of sheets commercially handled at the present time and with regularly employed railroad equipment. In fact, these blanks of glass approximate a length equalling two-thirds the length of the average or standard "flat" railroad car while their width substantially equals and in some instances actually exceeds the similar transverse dimension of the car. The need for glass blanks of such size is due to the fact that sheet or plate glass manufacturers by continued improvements in production techniques have found considerable advantage in making the glass in one locality and then carrying out the finishing operations in plants located in distant areas. It has also been found that when larger dimensional sizes of glass blanks are handled or shipped according to this invention a better "yield" or a greater total of usable glass will be obtained. Accordingly, the width of each so-called rough blank sheet may be as that of the originally formed ribbon while the length is determined by the requirements of the apparatus by means of which the surfaces of the blank are finished to finally obtain suitably sized smaller sheets of good optical quality.

By means of the present invention, the glass blanks can be firmly secured in flat, horizontally stacked relation with adequate devices for resisting shifting of the blanks due to the sway or bumping of the railroad car normally to be expected in such manner of transportation. It has further been found that the actual, permissible tonnage of glass, carried on a special car of this invention, can be so greatly increased over what was formerly considered the capacity of a railroad car that the economies thus obtained greatly over-balance any reasonable losses that might be incurred. And any normally expected laborious handling of the large blanks and danger to workmen because of possible glass breakage is minimized since the blanks can be easily loaded or unloaded by means of a crane.

It is therefore a principal object of this invention to provide a railroad car of novel construction having a specially mounted glass supporting structure equipped with adequately formed securing means for the safe transportation of large size glass blanks safely for long distances and to a method of transporting the blanks on said car.

Another object of the invention is to provide a glass sheet supporting structure that is constructed as an integral part of a railroad car.

Another object of the invention is to provide a supporting structure, integrally secured to the frame of the understructure of a railroad flat car and which is equipped with securing or confining means for the glass blanks to firmly position and reduce shifting of the blanks to an absolute minimum during motion of the car.

Another object of the invention is to provide in a supporting structure of the above character resilient means adapted to cushioningly engage the ends of the stacked glass sheets to absorb shocks originating while the railroad car is in transit and normally transmitted longitudinally from the ends thereof.

Another object of the invention is to provide a supporting structure of the above character having positively-acting securing members for holding the glass sheets thereon, said securing members being adapted to easy and rapid installation and removal.

A further object of the invention is to provide a railroad flat car having a glass supporting structure adapted to accommodate maximum tonnages of glass in large dimensional sizes.

A still further object of the invention is to provide a railroad flat car having an integrally constructed glass blank supporting structure that is adapted to be readily installed on such types of cars as they are presently employed for conventionally known purposes.

Other features and advantages of the invention will become more apparent during the course of the following description when read in connection with the accompanying drawings.

In the drawings, wherein like numerals are employed to designated like parts throughout the same:

FIG. 1 is a perspective view of a railroad flat car constructed in accordance with the present invention;

FIG. 2 is a similar perspective view of the railroad car when prepared for loading or unloading operations;

FIG. 3 is a plan view of the railroad car;

FIG. 4 is an enlarged plan view of one end of the railroad car of FIG. 3;

FIG. 7 is a vertical longitudinal view of the railroad car taken on line 7—7 in FIG. 5;

FIG. 8 is a detail view of the lower part of a side wall of the railroad car;

FIG. 9 is a fragmentary perspective view of the side wall of FIG. 8;

FIG. 10 is a fragmentary perspective view of an upper part of the side wall;

FIG. 11 is a similar fragmentary perspective view of an end of the wall;

FIG. 12 is a detail view taken on line 12—12 of FIG. 8;

FIG. 13 is a perspective view of the cover frames for a package of glass blanks;

FIG. 14 is a perspective view of a part of a support frame;

FIG. 15 is a fragmentary perspective view of the support frame;

FIG. 16 is a perspective view of an end bulkhead;

FIG. 17 is a perspective view of a clamping device;

FIG. 21 is a fragmentary horizontal detail view of a modified form of the invention;

FIG. 22 is a plan view of a modified manner for transporting a plurality of glass blank packages on the railroad flat car of this invention;

FIG. 23 is a side elevation of one end of the car of FIG. 22;

FIG. 24 is a vertical longitudinal sectional view taken on line 24—24 of FIG. 22; and FIG. 25 is a fragmentary perspective view of a modified form of bracing member.

Figure 5:
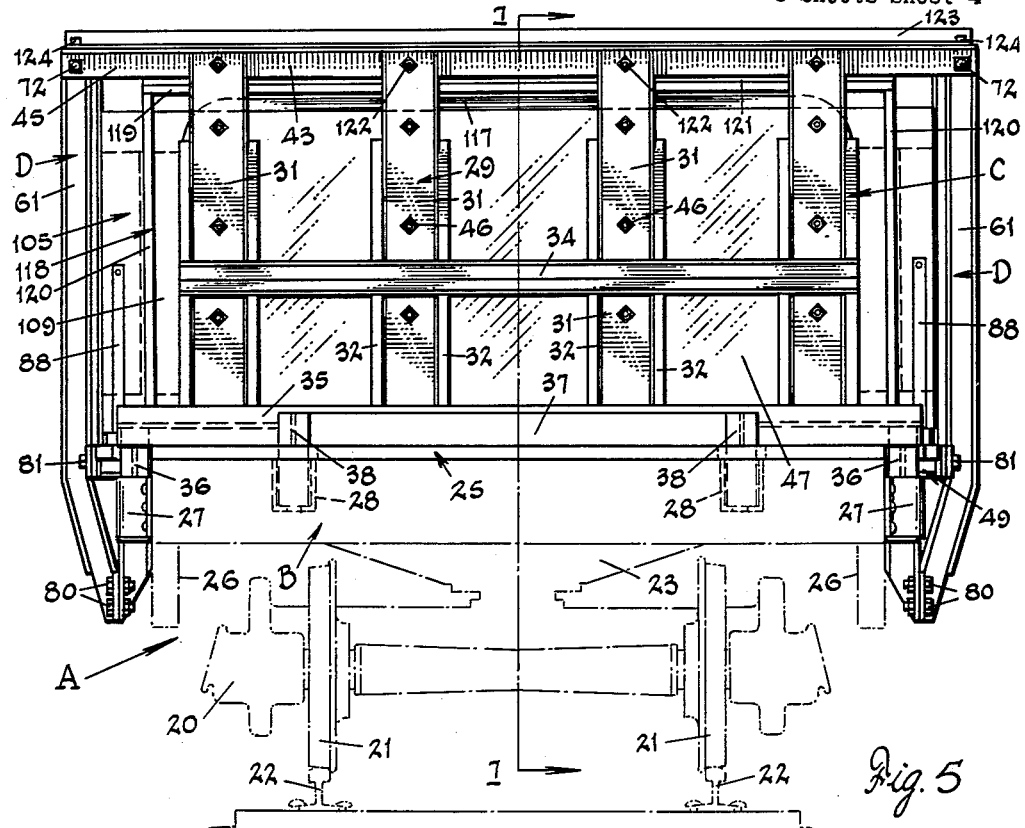
FIG. 5 is an end elevation.

According to the present invention, the typical wheeled understructure of a railroad flat car is equipped with integrally related and especially mounted support structures that are adapted to receive a plurality of glass sheets or blanks of relatively large dimensions. Associated with these support structures are novelly constructed securing members that are operable to firmly hold the blanks of glass thereon. This provides a mutually rigid relationship between the support structure and the flat car and a releasably rigid relationship between the car, the support structure and the securing members to the end that shifting or jolting of the glass blanks will be materially reduced.

Thus, as shown in FIG. 1 of the drawings, in practicing this invention, a railroad flat car, generally designated by the letter A, has the conventional understructure or body framing B equipped, during construction, with rigid bracing frames, or aptly described "strong backs," generally designated by the letter C. These frames are positioned in the end areas of the railroad flat car and cooperate with removably mounted side walls or gates D that are adapted to be positioned longitudinally along the sides of the car A, to form a glass sheet or blank enclosing structure E. Accordingly, within the confines of this structure, a plurality of glass blanks can be arranged in stacked relation and suitably contained within covering or securing members to form a unitized package, generally designated by the letter F, for convenient and economical transportation purposes. While one such package of glass blanks is illustrated in FIGS. 1 and 2, it will be appreciated that by slight modification of certain of the covering or securing members, unitized packages of glass blanks of smaller dimension can be transported on a railroad flat car constructed in accordance with the present invention.

For this purpose, the so-called package of glass blanks primarily consists of a lower frame or skid, designated by the letter G and illustrated in FIG. 14, and on which the glass blanks or sheets S are laid flat. When the desired number of blanks have been placed horizontally one upon another on the skid, they are enclosed around the sides and top thereof with suitable protective sheeting on which reinforcing members are arranged and securely positioned by banding members, to herinafter be more fully described in detail. When this package has been properly completed, one or both side gates D are integrally connected to the sides of the car and to the bracing frames C after which the railroad car is substantially in condition for transportation purposes.

Now, preparatory to unloading of the glass blanks, it is usually only necessary to remove one side gate before removing the protective and securing members from about the stack of glass blanks. While an unsupported glass blank S is shown above the flat car, as illustrated in FIG. 2 of the drawings, it is to be understood that the actual loading or unloading is preferably carried out by means of a large frame on which a plurality of vacuum cups are attached. Since the dimensions of one size of the glass blanks carried on a railroad flat car of the invention are in the range of 416" long and 127" wide and the weight thereof usually is in the range of 1200 pounds, the necessity for handling of the blanks by a crane and in this manner becomes apparent and additionally the problem of labor and safety for workmen is greatly improved.

Referring now more particularly to the drawings, the body or understructure B of the railroad flat car A is carried in the usual manner by trucks 20, having pairs of wheels 21, on the rails 22 of the track T. The understructure B is conventionally formed of longitudinally and transversely disposed frame members, generally indicated by the numeral 23, that are structurally provided in the construction of the car to reinforce the same and support the planking 24 forming the floor 25 thereof. Also, the side plates or panels 26 of the flat car are conventionally equipped with so-called stake pockets 27 while at each end of the car similar pockets 28 are provided in the floor 25.

The end frame members or "strong-backs" C are arranged at the ends of the car and consist of suitably arranged structural channel and I-beam members that are integrally connected as a rigid weldment. More particularly, the frame members C include a plurality of L-shaped channel members 29 having horizontally disposed base portions 30 and vertically disposed post portions 31 arranged substantially at right angles to the bases 30. Suitable pairs of bracing channels 32 are angularly positioned with reference to the base portions 30 and the post portions 31 and at their respective ends are rigidly attached thereto. In like manner, integral angle members 33 and 34 are arranged transversely to the several channel members 29 and bracing elements 32 to reinforce the same. The similar ends of the base portions 30 are affixed in common, and as by welding or like means, to a transversely arranged I-beam 35.

At each of the outer ends of this structural member, a downwardly directed post 36 is secured while on the opposite side thereof a bracing framework 37 is integrally attached. This framework is also equipped with downwardly directed posts 38. Preferably the spaced relation between the posts 36 and the posts 38 is such that when the frame member C is arranged at an end of the railroad flat car, the posts 36 can be inserted into the endmost stake pockets 27 while the posts 38 are similarly received in the pockets 28. This affords a structurally rigid interconnection between the weldment body of the member C and the understructure B of the car; however, each base portion 30 is provided with suitably spaced openings for receiving anchor bolts 39. These are passed through said base portions, the planks 24 and structural members of the car body B therebeneath and by means of conventional nuts 40 and washer plates 41 operate to permanently mount the frame on the floor of the car. Additionally, both the base portions and the floor can be provided with aligned holes 42 which will serve as "weep-holes" to drain off any water undesirably accumulating in the base portions of the channels 29. The upper ends of the several upright channel portions 31 are mutually interconnected by a structural angle 43 along the downwardly directed leg portion 44 thereof and, for purposes to be hereinafter more fully disclosed, the ends 45 of this angle extend considerably outward from the frame member C generally. And mounted by means of bolts 46 there is a backing plate or panel 47 of suitably built-up plywood or like wood panels.

Between the opposed surfaces of the frame members or strong-backs C, the floor 25 of the car A is provided with longitudinally arranged planks 48 that are substantially equally spaced from one another transversely with reference to the width of the railroad flat car. The planks 48 are adapted to provide substantially continuous support surfaces for the lower frame or skid member G on which the glass blanks S are arranged in stacked relation.

According to the preferred embodiment of the invention, the actual width of the glass blanks is the same as the width of the continuous glass ribbon ordinarily produced by a glass furnace and, as herein described, to maintain such a width for ultimate finishing operations of the glass, the sides of the flat car are equipped to support the glass blanks even though the margins thereof would normally and objectionably overhang the sides of the car therebeneath. To adequately support the blanks and at the same time permit a satisfactorily secure mounting of the side gates D in order that the glass blanks can be firmly positioned and suitably protected from damage, support members 49 are positioned in several stake pockets 27 along each side of the flat car.

These support members 49, as best seen in FIGS. 8 and 9 of the drawings, are suitably formed of structural I-beam material and are shaped with an upper, horizontally disposed portion 50 and a depending leg portion 51.

The outer end of the horizontal portion 50 is provided with a vertical plate 52 having spaced bolt holes and nuts 53 aligned therewith, said nuts being attached as by welding to the inwardly facing or rear surface of the plate. The leg portion 51 of each support member 49 is adapted to be received in a stake pocket 27 which, as conventionally constructed, is a suitable U-shaped bracket 54 and having outwardly directed flanges by which the plate is bodily secured to the side panels 26 of the car as by rivetting.

To afford easy insertion of a member 49 into an associated pocket and without materially altering the structural members and rivetting of the flat car, the inwardly facing flange and the integral web of the leg portion 51 is suitably chamfered as at 55. The oppositely disposed and outwardly facing flange 56 is, however, provided with a plurality of vertically spaced bolt openings that are aligned with nuts 57 integrally secured to the rear surface of the flange. In order to mount the support member in substantially fixed relation to the stake pockets 27, the webs 58 of the brackets 54 therefor are equipped with set-screws or bolts 59 and additionally, as shown in FIG. 12, metal wedges 60 may be forced upwardly between the inner surface of the web 58 and the leg portion 51 of the member 49. This enables rapid and rigid installation of the support members along the sides of a substantially conventionally constructed railroad flat car and as quick removal therefrom in a simple manner.

The side gates D, that are mounted along the sides of the railroad car and by means of the support members 49, include a plurality of vertically disposed I-beam members or stakes 61 and a horizontally disposed structural angle or rail 62 connected to the upper ends thereof. While these associated members may be rigidly interconnected to form a gate or side wall D, experience in the manner of rapidly handling the side gates has taught that the rail 62 can be more advantageously removably attached to the upper ends of the stakes although in their assembled relation the stakes and the rail constitute an outer wall of adequately rigid character for the glass package F.

For these purposes, the outwardly facing flange portion 63 at the upper end of each stake 61 is notched out, as shown in FIG. 10, to receive the downwardly directed leg 64 of the angular rail 62 while the integral web 65 of the stake has a rigidly mounted angular bracket 66 attached thereto. The horizontal leg 67 of the bracket is equipped with a nut 68 welded to the under surface. The rail 62 accordingly is secured to the upper end of each stake by means of bolts 69 passed through the rail, the bracket and threaded into the respective nut 68. The opposite ends of each rail are similarly provided on the downwardly directed leg 64 thereof with an angular bracket 70 having a rigidly affixed nut 71 (FIG. 11). By means of bolts 72 passed through aligned holes in the leg 44 of the angle 43 and in the extreme ends 45 thereof, the side gates D are substantially fixedly and rigidly secured to the strong-backs C although of course for disassembly to enable loading and unloading of the flat car, the bolts 72 may be employed to good purpose.

Each stake 61 is formed at its lower end to afford a similar means for rapid connection to or removal from the sides of the flat car. For this purpose, each stake is suitably provided with a mounting plate 73 adapted to be aligned with the plate 52 of an associated support member 49. Beneath the plate 73, the stake is shaped with an angularly directed portion 74 which is formed to integrally carry a plate 75 having bolt holes adapted to register with the nuts 57 mounted on the flange portion 56 of the leg portion 51. On each stake 61, the inwardly facing flange 76 is provided with a relatively thick layer of felt 77 suitably cemented to a wood strip 78 that is secured by bolts 79 to said flange.

Thus, in mounting a side gate D on the side of the railroad flat car of this invention, the several stakes 61, in successive order, are positioned with the lowermost plates 75 against the flange 56 and bolts 80 are inserted therethrough to be threaded into the associated nuts 57. Bolts 81 are then similarly passed through plates 73 and 52 and threaded into nuts 53. Preferably after the stake has been properly positioned by insertion of the several bolts 80 and 81, the same can be tightly turned with reference to the associated nuts thereby rigidly securing the stake 61 to its related support member 49. In turn, the rail 62 is then placed along the upper ends of the stakes and there secured by means of bolts 69. And in order that this rail of considerable length and weight can be easily handled manually or by means of crane hooks, several "grabs" or handles 82 are provided along the upper surface of each rail.

The previously described package or unitized load of glass blanks F is supported on the longitudinally disposed planks 48 that are in one way or another fixedly secured to the floor 25 of the car. This so-called package basically includes the lower frame member or skid G which is bodily supported on the longitudinally disposed planks 48. This skid G, as shown in FIG. 14, consists of longitudinally disposed bars 83 and transverse rails 84, each being wood of suitable width and thickness. The bars 83 actually are formed by two thicknesses of wood members which, for the novel purposes of this invention, simultaneously serve to anchor one end of banding members that enclose the completed package of glass. Thus, the base member 85 of each bar 83 is substantially continuous between its ends while the upper member 86 is generally formed by several separate lengths of wood which in their aggregate length are substantially equal to the length of the glass blanks to be carried which length in either case is shorter than the relative length of the base members 85. One purpose for utilizing several lengths to form the upper bar member 86 is to form notch areas 87 (FIG. 15) in which the ends of a banding material can be adequately secured. Another reason for assembling the base and upper members 85 and 86 in this manner together with the transverse rails 84 is to enable the positioning of necessitated "lap-joints" in desirably alternate relation thereby suitably maintaining rigidity of the skid G.

Accordingly, a metal strap 88 of conventional banding material is laid down along and inwardly from the ends of the base bar 85 and covered by the upper member 86 which can then be properly nailed or otherwise secured. The innermost end of the strap is thus positioned in a notch area 87 and is secured to the base member 85 by means of a suitable retaining device or plate 89. Several lengths of banding straps are also including along the length of the skid G as indicated at 90 in FIG. 14 and arranged transversely so as to extend outwardly from the sides thereof. The free portions of each of these banding straps are of considerable length to enable girding of the glass package and provide ample end material to receive a conventionally known form of banding clamp.

Ordinarily, when loading or unloading a railroad flat car of this invention and according to the preferred embodiment thereof, one side gate D is removed as shown in FIG. 2. The glass blanks S are then laid in stacked relation on the skid G which initially has been covered by one or more layers of corrugated board or other separating and/or cushioning materials 91. As earlier indicated and although not hereinshown, the glass blanks are handled by means of so-called vacuum frames customarily employed in the lifting of glass sheets or plates. This is particularly important in connection with the present invention since each glass blank of nearly thirty-five feet in length and ten and a half feet in width, weighs slightly over a half ton. Thus a blank as indicated in FIG. 2 can be transferred by a crane and a suitable handling device carried thereby, from a storage location and then placed on the railroad car as it is swung into a substantially horizontal plane. Usually in preparing the railroad car for transportation of glass blanks, a sheet or panel of wood veneer or relatively thin plywood 92 is secured, in one way or another, to the several stakes of the mounted side gate D and it is against this outer, vertically supported panel that one edge of the glass blank is substantially located as the blank is loaded onto the car.

When the desired number of blanks S have been placed in stacked relation with alternately interposed sheets of corrugated board or like material 91, to form a unitary package F, the installation of the enclosing structure E is carried out. This includes a covering or protective layer of plywood or similar weather-resistant board material 93 on the uppermost layer of corrugated board 91; a framework 94 then being laid on the material 93. As seen in FIGS. 3 and 13, this framework is formed by two or more individual frames and, for ease of handling, three such frames are herein provided; and the end frames being the same in structure. Thus, each end frame 95 is formed of longitudinally arranged wood slats 96 that are interjoined by transversely disposed slats 97, 98 and 99. Preferably the slats 97 are secured at one of the ends of the slats 96; the slats 98 inwardly of the opposite ends of slats 95 and the slats 99 medially therebetween. On the other hand, the center frame 100 includes longitudinally disposed slats 101 and pairs of transverse slats 102 and 103. As illustrated in FIG. 13, this center frame 100 has been spaced upwardly from the adjacent end frame 95 to indicate that when the frames are located in the same plane as indicated in broken line or more practically on a stack of glass blanks, the slats 101 of the frame 100 will be located alternately in the spaces between the slats 96 of frames 95 while the endmost transverse slats 102 will rest upon the "open" ends of the slats 96 in close proximity to the transverse slats 98 secured thereon.

Figures 18, 19:
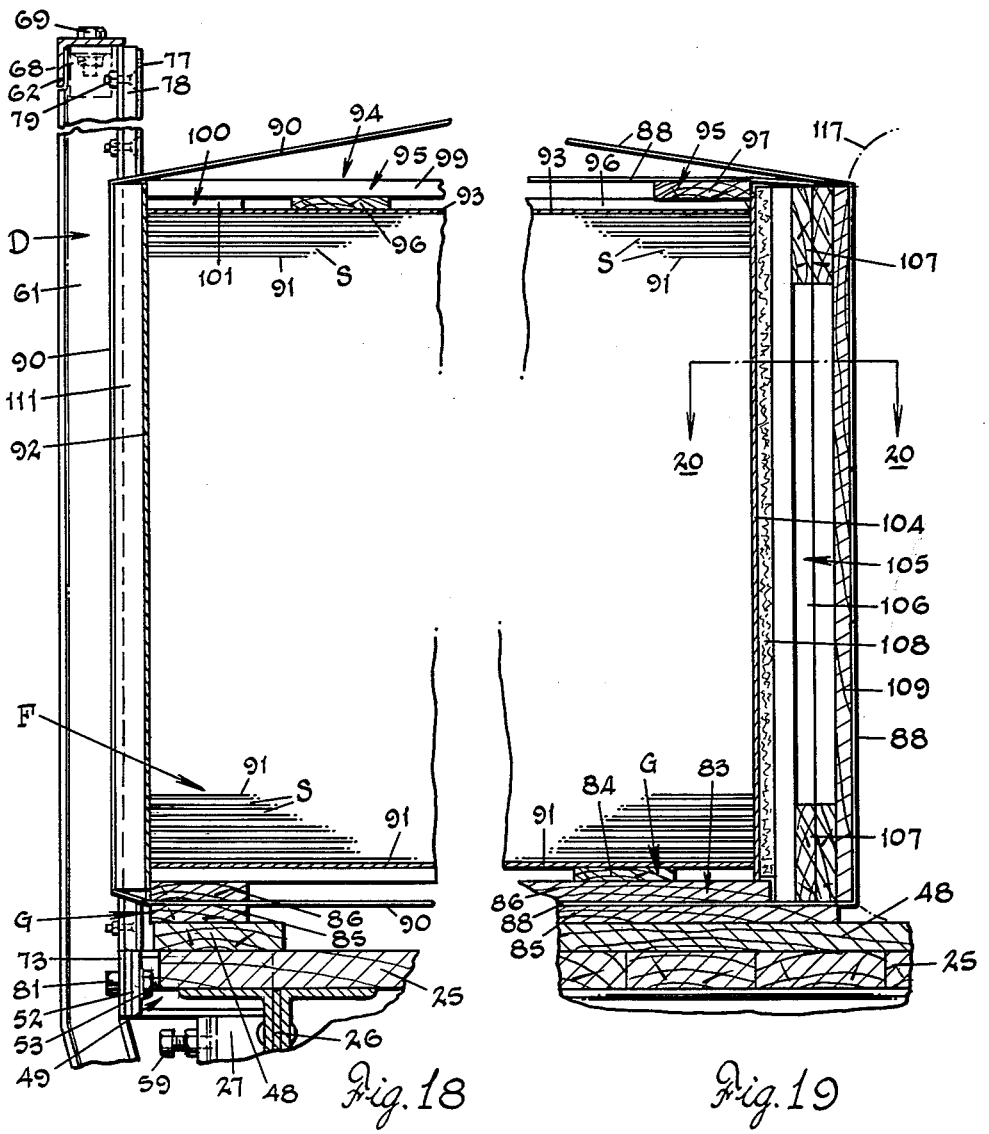
FIG. 18 is an enlarged transverse sectional view at one side of the railroad car.
FIG. 19 is a similar enlarged longitudinal section view at one end of the car.
Figure 20:
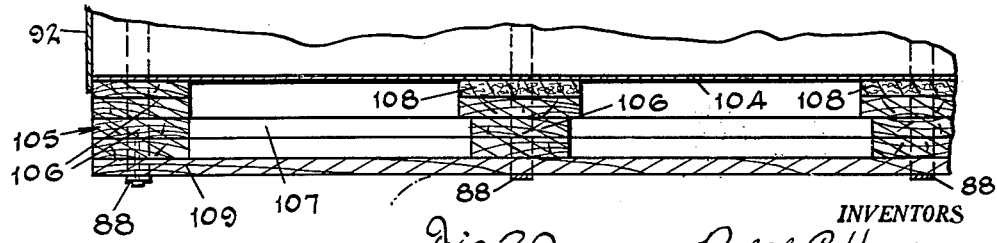
FIG. 20 is a horizontal sectional view taken on line 20—20 of FIG. 19.

Protective sheeting 104 is now placed against the respective ends of the glass blanks and end frames or so-called "bulkheads" 105 are mounted thereagainst as shown in FIGS. 19 and 20. Both of these frames, as illustrated in FIG. 16, are generally of a built-up wooden structure and include vertically positioned bars 106 which are spaced substantially the same distance apart as the bars 83 of the skid G. The upper and lower ends respectively of the bars 106 are integrally interconnected by horizontally disposed rails 107. The centermost bars 106 are equipped with a relatively thick layer 108 of felt or like cushioning material which is slightly shorter at its lower end than the related bar 106. The surface of the frame 105 opposite the felt layers 108 is covered or formed by a panel 109 of plywood or the like. Usually the endmost bars 106 are provided with an additional wooden slat which however is relatively thinner than the felt layers 108.

When the bulkheads 105 are arranged at the ends of the stacked blanks of glass as seen in FIGS. 7 and 19, the lower rails 107 are supported on the surfaces of the base member 85 of the skid bars 83 while the ends of the upper members 86 thereof are received beneath the lower edges of the felt layers 108. In the manner above described, the several stakes 61 of the side gate, to be now mounted, are secured to their associated support members and the panel of sheeting 92 will be urged against the edges of the glass blanks when the several bolts 80 and 81 are tightly turned into the respective nuts 53 and 57. Of course, the actual amount of relatively positive pressure, established against the glass when the stakes are fixedly mounted, is absorbed by the layer of felt 77 on each stake.

At this time, the ends of the several centrally disposed bands 88 brought upwardly about the bulkheads 105 and are joined by suitable clamps 110 in the usual manner. Normally the outermost straps 88 are relatively short and are secured as by nailing, to the outer surface of a bulkhead 105; this acting to more or less positively locate said bulkhead relative to the skid G. Likewise, the bands of strapping material 90 are brought upwardly along the sides of the glass package F. More particularly, a wood slat 111 is arranged against the outer sheathing 92 so that the effect of the pressure created when the ends of these bands are secured together by clamps 110 will create an equalized amount of pressure against each side of the glass package but will in no wise bear directly upon the edges of the glass blanks.

In order to evenly distribute the tensioning effect of the several bands 88 and 90, it will be seen as in FIG. 3, that the bands 88 are arranged to extend longitudinally of the package in substantially equally spaced relation to the width thereof while the several bands 90 are located transversely at equally spaced distances between the ends of the package. The bands 88 and 90 thus cross at substantially right angles to one another and in order to firmly maintain the top framework 94 on the top of the package F, several so-called "truss" boxes 112 are arranged thereon. These boxes, as seen in FIG. 17, may be formed of wood and include vertically disposed side walls 113 and end walls 114 that are somewhat shorter than the height of walls 113 to form notches 115. On the upper edges of the walls 113 and substantially at the ends thereof, cap plates 116 of wood are added to reinforce the box generally and more especially provide adequate bearing surfaces for banding purposes.

Figure 6:
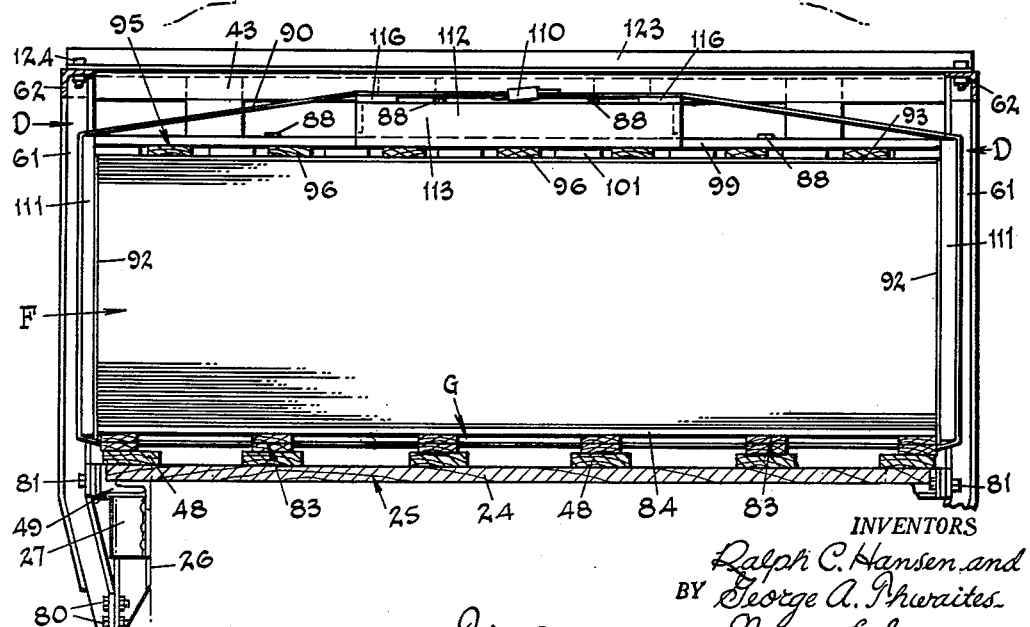
FIG. 6 is a vertical transverse sectional view taken on line 6—6 in FIG. 3.

Thus, upon reference to FIGS 3, 6 and 7, it will be seen that the truss boxes 112 are placed on the sections 95 of the framework 94 so that the slats 98 thereof will be received in the notches 115 while the lower surfaces of side walls 113 will rest on several of the longitudinally disposed slats 96. Likewise, the truss boxes on the central frame section 100 will be placed so as to rest on the slats 101 and the transverse slats 102 will be received in the notches 115 thereof. When the ends of the bands 90 are placed together, tensioned in the usual manner and then secured in fixed clamped relation, the tension thus created will exert a positive pressure not only against the slats 111 along the sides of the glass package but, in being supported on the cap plates 116 of the boxes 112 will cause the walls 113 thereof to firmly engage the longitudinal slats of the several sections of framework 94 to press the same downwardly on the upper protective sheeting 93. This manner of securing the enclosing structure E for the glass package F is additionally increased by the positioning of the centermost bands 88 on the upper surfaces of the truss box walls 113 as shown in FIG. 7.

When the upper ends of the several bands 88 have been secured together, their substantially continuous lengths will bound the bulkheads 105, engage the endmost slats 97 of the frame sections 95 and, in passing over the truss boxes 112 will completely surround the glass package while increasing the amount of compressive force exerted on the boxes 112 by the bands 90. And while the bands 88 are intended to serve this purpose, it will be appreciated that the total weight of the glass blanks to some extent operates to positively hold the lower ends of these bands, interposed between members 85 and 86 of bars 83, from any possibility of loosening.

An additional novel feature of this invention is the use of pneumatic means to absorb the shocks occasioned by end-wise bumping of the railroad cars and normally transmitted longitudinally against packaged material carried thereon. As herein provided, large inflatable rubber bags 117 are employed between the panels 47 attached to the strong backs C and the panels 109 of the end frames 105. One type of such bag is produced by the U.S. Rubber Co. and sold as an inflatable dunnage member under the trademark "Shor-Quik." As shown particularly in FIG. 7 of the drawings, the bags are preferably of a dimensional size equal to that of the bulkheads 105. When so positioned and inflated to a pressure of substantially 5 p.s.i., the bags have been found to effectively operate to materially reduce, if not completely eliminate, the tendency of a material to be shipped, and in the case a package of glass blanks, to shift when subjected to sudden vibration or bumping normally to be expected in railroad transportation. Otherwise the bulk of the package weight could carry the ends thereof into impacting engagement with fixed end frames, such as the strong backs C with resultant breakage of one or more glass blanks. Despite the fact that each of the blanks as presently described is of considerable length and width and consequently more susceptible to breakage, actual experience gained from repeated shipping of glass in this manner has proven that the amount of glass broken has been relatively small in comparison to the overall tonnage received in good condition. However, since it has been also found that greater breakage is ordinarily sustained in the end areas of the glass blanks, the fact that they are of considerable size usually enables the remainder of the blank to be salvaged for finishing operations in the normal manner.

A shield for the inflated dunnage bags 117 is provided to protect the same from damage which might be incurred when the railroad car is in transit and some air-borne object accidentally dropped thereupon. For this purpose a wooden hood or shield 118 is attached to the angle 43 of each strong back C and may be formed by a horizontally disposed top piece 119 and vertically disposed side boards 120. The top piece is provided with a vertical wall 121 adapted to be removably mounted against the leg 44 of the angle 43 by means of bolts 122.

When the enclosing structure E for the package F of glass blanks has been completely installed, the remaining rail 62 for the side wall D is mounted on the several stakes 61 and there secured by means of the bolts 69 that are inserted through the rail and threaded into fixed nuts 68. The ends of rail 62 are then substantially rigidly connected to the ends 45 of the rail 43 by bolts 72.

When the stakes 61 have thus been secured to the side walls 26 of the railroad car A and the side gates D completed by the installation of the rail 62, the connection of the ends of the rail to the rail 43 serves to afford a substantially rigid structural relation between the side gates D and the strong backs C. Of course, the rectangular association of the side gates D along the sides of the car with the strong backs C at the ends of the car creates a very substantial barrier above the glass package to protect the same.

The side gates are further adapted to be interconnected by one or more bracing members 123 that are mounted at their opposite ends on the top rail of each gate. For this purpose, each brace 123 may be provided in the form of a structural angle or beam that is provided at each of its ends with a bolt or pin receiving opening through which a securing member 124 can be inserted into a like opening in the rail 62 as indicated at 125 in FIG. 10. By means of the brace members 123, any laterally directed stresses exerted against one or the other of the side gates D will be reversely absorbed or compensated for by the rigidity of the oppositely disposed side gate.

As illustrated in FIG. 21 of the drawings, the relative position of the straps 88 can be as effectively arranged by the grouping of said straps in pairs and by increasing the width of the felt layers 108. This reduces the actual spacing of the banding means between the sides of the stacked sheets but in some instances it has been found advantageous to longitudinally gird the packaged unit of glass sheets as herein shown. The pairs of straps 126, as shown in FIG. 21, accordingly provide a modified manner of securing the unit of glass sheets F and afford a form of "two-point" engagement between the ends of the unit.

While it is believed quite apparent that unloading of the glass blanks would be carried out in a reverse manner to that above described for the loading thereof, a short description may be of some additional assistance in the understanding of the novel features of the preferred form of this invention. Thus upon arrival of the railroad flat car at the terminus of its route the same will appear as viewed in FIG. 1 of the drawing. Preferably the car is located in an area wherein handling and storage equipment for the glass blanks is maintained, and a side gate D is then removed from one side of the car. This is accomplished by release of the members 124 for removal of the bracing members 123. The several bolts 69 and 72 are then removed to enable the rail 62 to be lifted from its position on the stakes 61 and from between the rails 43 adjoining its opposite ends. The stakes 61 are freed from their associated support members 49 by removal of the bolts 80 and 81. The pressure exerted by the dunnage bags 117 is then reduced to relieve the end pressure on the bulkheads 105.

Now the clamping devices 110 are opened to release the ends of bands 88 and 90 which will permit removal of the truss boxes 112. Alternatively, the several bands 88 and 90 can be conventionally severed to release the same. The sections 95 and 100 making up the top framework 94 are then removed and subsequent lifting of the protective pieces of sheathing 92, along one side of the glass package, and 93 on the top thereof will permit the actual transfer of the glass blanks to be carried out as shown in FIG. 2.

As shown in FIGS. 22 to 25 inclusive, the glass sheet enclosing structure E can be modified to enable the shipment of glass sheets or blanks of smaller dimensions than the dimensions of the glass blanks hereinabove described. This may be advantageous to reduce the problem of handling waste glass or the marginal portions removed when the blank or glass ribbon is cut to the desired size. Accordingly the removed marginal portions can be utilized as "cullet glass" at the source of glass making and without any problem of further transportation.

For this purpose, the railroad flat car A is equipped with the previously described strong backs C and side gates D. However, in accordance with this modified form or manner of transporting glass blanks, two so-called packages H are formed on skids J which (as shown in FIG. 23) are somewhat modified in structure from the skid G. Thus, the upper members 127 of bars 128 of the modified skids J are spaced in endwise relation, in the medial area of the base members 129, to provide additional notches 130 and 131. This enables securement of the ends of bands 132 and 133, as by plates 134, in the notches 130 and both bands to be extended upwardly from the common, centermost notch 131. In laying up glass blanks in this manner, the cross-rails 135 of the modified skids J are covered with sheets of corrugated board and the glass arranged thereupon with alternate corrugated board sheeting for cushioning.

Now when stacks of sufficient blanks have been created, the sides, top and ends are protectively covered by sheets of veneering or like weather-resistant material. A framework 136, substituted for the previously employed framework 94, is placed upon the top covering material. The end frames or bulkheads 105 are then positioned against the stack adjacent the strong backs C while end frames or bulkheads 137 of the same or slightly smaller size are arranged at the opposite end of each stack. Upon the placement of the framework 136 and the truss boxes 112 thereon, the ends of bands 132 are brought up about the frames 137 and combined with the ends of the bands 88 girding the bulkheads 105 at the ends of the car. This acts to secure the stacks of glass blanks on the skids J and substantially from longitudinal shifting thereon. The metal bands 90 are now brought upwardly along the sides of the stack over slats 111 and tensioned on the truss boxes 112 to establish a downwardly directed compressive force on the stack.

As described in connection with the preferred form of this invention, inflatable dunnage bags 117 are placed between the strong backs C and the bulkheads 105. Now, since the longitudinal dimension of the packages H will undoubtedly vary, the actual number of dunnage members employed cannot be stated with certainty. However, and as shown in FIG. 22, by way of illustration, one additional bag 117 can be used at the ends of the car while one bag 138 is placed between the packages in the center of the car. These central spacings naturally may vary and the number of bags increased to achieve the same purpose and desired result.

Since the widths of the glass blanks making up the packages or units H are usually expected to be narrower than the width of the originally-formed glass ribbon, spacer members are employed between several of the stake members 61 and the sides of the package. One example of such a spacer is shown in FIG. 25 wherein it will be seen that the member 139 is generally rectangular and is comprised of vertically disposed slats 140, 141 and 142 with spreader slats 143 and 144 at the lower and upper ends thereof. Pairs of wood rails 145 are secured to the edges of the slats 140–142 and are provided with extended ends 146. These end portions form notches as at 147 whereby the spacer can be firmly positioned against a stake 61 with the surface of slat 142 bearing against the sides of the packages as indicated by the broken lines H. This manner of supporting the glass blanks from lateral displacement affords a relatively inexpensive way of equipping a railroad car for the transportation of smaller sizes of glass blanks by reason of the fact that the spacer members are either reusable or can be replaced by others of like character that are longer or shorter between the vertical slats 140 and 142.

While the term "blank" has been employed throughout the specification to generally describe a sheet of glass having unfinished surfaces, and to be transported on the railroad flat car of this invention, it is not intended by such definition to in anywise limit the scope of this invention. Consequently, it is herein contemplated that finished or semi-finished sheets or plates of glass, as well as other materials, can be shipped with equal advantage when secured into a package and in horizontally disposed relation according to the invention. In fact, the term "sheet" has been otherwise employed herein to enlarge the descriptive terminology without departing from the spirit of the invention.

It is to be understood that the forms of the invention herewith shown and described are to be taken as illustrative embodiments only of the same, and that various changes in the shape, size and arrangement of parts may be resorted to without departing from the spirit of the invention or the scope of the subjoined claims.

We claim:

1. In a railroad flat car having a wheeled understructure including an elongated frame supporting a rectangular, substantially horizontal floor, the combination of bracing frames extending transversely across said car at opposite ends thereof, each of said bracing frames comprising a plurality of L-shaped members disposed side by side in spaced relation and extending transversely across said car with each of said members having horizontal base portions extending along the floor and integral vertical disposed leg portions upstanding from said floor, a horizontal rail extending transversely across the car and connecting the upper ends of said leg portions of each of said bracing frames, side gates disposed along opposite longitudinal sides of said car and projecting upwardly from said floor, each of said side gates comprising a plurality of vertically disposed stake members spaced apart longitudinally along said car, means mounting the lowermost ends of each of said stake members to said frame, a horizontal rail extending longitudinally of said car at each side thereof and being secured to upper ends of the stake members, means detachedly connecting said transversely disposed rails to said longitudinally disposed rails at the corners of said car thereby to form an integral structure having transversely and longitudinally opposed vertical walls for receiving therebetween a stack of sheets laid horizontally, one upon the other, and for preventing longitudinal and lateral shifting of the sheets relative to said floor, rails disposed transversely of said car intermediate said bracing frames and spanning said longitudinally disposed rails with their opposite ends removably attached to said longitudinal rails, and cushioning means disposed inwardly of said bracing frame to connect the end edges of the stacked sheets.

2. In a railroad flat car as defined in claim 1, said stake mounting means comprising support members, each having a horizontally disposed portion and a vertically disposed portion, flanges integral with opposite sides of said vertically disposed portion and adapted to be received in brackets on said car frame thereby to removably attach said support member to said frame with said horizontal portion extending laterally outwardly therefrom, a vertically disposed plate fixed to the outer end of said horizontal portion and means for securing said stake members to said plate.

References Cited in the file of this patent

UNITED STATES PATENTS

| | | |
|---|---|---|
| 1,785,982 | Scott | Dec. 23, 1930 |
| 2,004,626 | Hann | June 11, 1935 |
| 2,169,677 | Burrell | Aug. 15, 1939 |
| 2,276,866 | Pierce | Mar. 17, 1942 |
| 2,674,206 | Scott | Apr. 6, 1954 |
| 2,819,688 | Hall | Jan. 14, 1958 |
| 2,826,156 | Hall | Mar. 11, 1958 |
| 2,856,867 | Dasey | Oct. 21, 1958 |
| 2,874,834 | Woodward | Feb. 24, 1959 |
| 2,940,402 | Hansen et al. | June 14, 1960 |